(12) United States Patent
Deindl

(10) Patent No.: US 11,486,506 B2
(45) Date of Patent: Nov. 1, 2022

(54) SAFETY VALVE FOR A HOUSING, AND ENERGY STORE FOR STORING ELECTRIC ENERGY

(71) Applicant: AUDI AG, Ingolstadt (DE)

(72) Inventor: Andreas Deindl, Großmehring (DE)

(73) Assignee: AUDI AG, Ingolstadt (DE)

( * ) Notice: Subject to any disclaimer, the term of this patent is extended or adjusted under 35 U.S.C. 154(b) by 239 days.

(21) Appl. No.: 16/958,840

(22) PCT Filed: Nov. 19, 2018

(86) PCT No.: PCT/EP2018/081776
§ 371 (c)(1),
(2) Date: Jun. 29, 2020

(87) PCT Pub. No.: WO2019/137668
PCT Pub. Date: Jul. 18, 2019

(65) Prior Publication Data
US 2020/0378510 A1    Dec. 3, 2020

(30) Foreign Application Priority Data

Jan. 10, 2018 (DE) ..................... 10 2018 200 254.1

(51) Int. Cl.
| | | |
|---|---|---|
| *F16K 17/16* | (2006.01) | |
| *F16K 17/164* | (2006.01) | |
| *H01M 50/342* | (2021.01) | |

(52) U.S. Cl.
CPC ............ *F16K 17/16* (2013.01); *F16K 17/164* (2013.01); *H01M 50/3425* (2021.01); *H01M 2200/20* (2013.01)

(58) Field of Classification Search
CPC .. F16K 17/16; F16K 15/147; H01M 50/3425; H01M 2200/20
See application file for complete search history.

(56) References Cited

U.S. PATENT DOCUMENTS 3,861,416 A * 1/1975 Wichterle ............. A61F 2/2403
137/849
4,924,923 A * 5/1990 Boehmer ............... B60K 15/04
277/560

(Continued)

FOREIGN PATENT DOCUMENTS

| CN | 202930452 U | 5/2013 |
| CN | 103219482 A | 7/2013 |

(Continued)

OTHER PUBLICATIONS

German Examination Report dated Aug. 1, 2018 in corresponding German Application No. 10 2018 200 254.1; 16 pages including Machine-generated Translation.

(Continued)

*Primary Examiner* — P. Macade Nichols
(74) *Attorney, Agent, or Firm* — Maier & Maier, PLLC

(57) ABSTRACT

A safety valve for a housing, for releasing a housing opening of the housing if a defined burst pressure is reached or exceeded in the housing. It is provided here that in a base body of the safety valve including an elastomer, a receptacle groove that is continuous in the circumferential direction is formed for the formfitting accommodation of a retaining web of the housing. The disclosure furthermore relates to an energy accumulator for storing electric energy.

8 Claims, 3 Drawing Sheets

(56) References Cited

U.S. PATENT DOCUMENTS

| | | |
|---|---|---|
| 2011/0305946 A1 | 12/2011 | Moride |
| 2013/0252037 A1 | 9/2013 | Chiba |
| 2015/0217417 A1 | 8/2015 | Takeshita |

FOREIGN PATENT DOCUMENTS

| | | |
|---|---|---|
| CN | 205863270 U | 1/2017 |
| DE | 10 2015 221 738 A1 | 5/2017 |
| EP | 2 131 416 A1 | 12/2009 |
| EP | 2 022 112 B1 | 12/2010 |
| EP | 1 321 993 B1 | 4/2012 |
| JP | 2012-146531 A | 8/2012 |
| JP | 2013-168293 A | 8/2013 |
| WO | 2011158822 A1 | 12/2011 |
| WO | 2016/002220 A1 | 1/2016 |

OTHER PUBLICATIONS

International Search Report dated Feb. 14, 2019 in corresponding International Application No. PCT/EP2018/081776; 8 pages.

Written Opinion dated Feb. 14, 2019 in corresponding International Application No. PCT/EP2018/081776; 16 pages including Machine-generated Translation.

Office Action dated Mar. 1, 2022, in connection with corresponding Chinese Application No. 201880085951.X (20 pp., including machine-generated English translation).

International Preliminary Report on Patentability dated Jul. 14, 2020, in connection with corresponding International Application No. PCT/EP2018/081776 (7 pp.).

Office Action dated Jul. 13, 2022, in connection with corresponding Chinese Application No. 201880085951.X (13 pp., including machine-generated English translation).

* cited by examiner

SAFETY VALVE FOR A HOUSING, AND ENERGY STORE FOR STORING ELECTRIC ENERGY

FIELD

The disclosure relates to a safety valve for a housing, for releasing a housing opening of the housing when a defined burst pressure is reached or exceeded in the housing. The disclosure furthermore relates to an energy accumulator for storing electric energy.

BACKGROUND

For example, the document EP 1 321 993 B1 is known from the prior art. This relates to a cell safety valve, which comprises a valve plate having a thickness, a fracture groove formed on the valve plate, and one or more auxiliary fracture grooves in an interior of the fracture groove, wherein the auxiliary fracture groove comprises formations such that a remaining thickness of the valve plate at the auxiliary fracture groove is thicker than a remaining thickness of the valve plate at the fracture groove, and at least one end of the auxiliary fracture groove is connected to the fracture groove. It is provided here that the fracture groove formed on the valve plate is a ring-shaped fracture groove, and a base section of the auxiliary fracture groove of the valve plate is wider than a base section of the fracture groove of the valve plate.

Furthermore, a bursting device is known from the document DE 10 2015 221 738 A1, which is capable of bursting under the effect of pressure, comprising a bursting disk, wherein the bursting disk comprises at least one bursting recess for bursting under the effect of pressure, wherein the at least one bursting recess was produced by means of a removal device, wherein the bursting disk comprises at least one calibration recess different from the bursting recess for calibrating the removal device.

SUMMARY

It is an object of the invention to propose a safety valve for a housing which has advantages over known safety valves, in particular is simple to produce and is to be installed on the housing.

This is achieved according to the invention by a safety valve for a housing. It is provided here that in a base body of the safety valve consisting of elastomer, a receptacle groove that is continuous in the circumferential direction is formed for the formfitting accommodation of a retaining web of the housing.

The safety valve serves to close the housing or a housing opening of the housing in a fluid-tight manner. The safety valve is designed such that it closes the housing or the housing opening in a fluid-tight manner when the pressure in the housing is less than the burst pressure. However, if the pressure in the housing reaches or exceeds the burst pressure, the safety valve thus opens and establishes a flow connection between a housing interior of the housing and an external environment of the housing. The pressure provided in the housing can be dissipated accordingly via the safety valve.

The housing is, for example, part of an energy accumulator for storing electric energy. Correspondingly, at least one battery cell is arranged in the housing, which is designed, for example, as a lithium-ion battery cell. A plurality of such battery cells is preferably arranged in the housing. The battery cell is protected from external influences, for example, moisture and/or mechanical force action, by the housing. For this purpose, the housing is designed to be leak-tight or at least essentially leak-tight.

To compensate for pressure differences between the internal pressure in the housing interior and the ambient pressure in the external environment, the housing can comprise at least one pressure compensation element. This pressure compensation element can compensate for pressure differences which are induced, for example, by temperature fluctuations or different ambient pressures. Such a pressure compensation element comprises, for example, at least one deformable or compressible element. However, the pressure compensation element preferably closes the housing leak-tight or is arranged in the leak-tight housing.

If there is a sudden and/or strong pressure increase of the internal pressure in the housing, for example, caused by mechanical damage, strong heating, overcharging, or the like of the battery cell, this pressure increase can thus no longer be compensated for by the pressure compensation element alone or a very high number of pressure compensation elements would be necessary. To prevent uncontrolled degassing or even bursting of the housing despite the pressure increase, the safety valve is therefore provided. It is possible in principle to use a burst element as a safety valve.

The safety valve according to the invention has, for example, the base body, in which the pressure relief opening is formed. The pressure relief opening is initially closed using the membrane. The membrane is formed in one piece and of the same material with the base body. It is designed in such a way that it tears as soon as the internal pressure in the housing reaches the burst pressure. The burst pressure is specified in this case in the form of a relative pressure, namely in relation to the ambient pressure. Instead of the burst pressure, reference could thus also be made to a burst pressure difference, the membrane tearing if it is reached or exceeded by a pressure difference between the internal pressure and the ambient pressure.

Alternatively to the design of the safety valve comprising the membrane, it can also be provided that the safety valve detaches as a whole from the housing as soon as the burst pressure is reached or exceeded. In this case, the base body and the receptacle groove provided therein are formed such that the formfitting connection to the housing detaches as soon as the burst pressure is reached. Moreover, the safety valve is designed in such a way that it is displaced out of the housing opening when the connection is detached by the pressure present in the housing.

To be able to fasten the safety valves easily and quickly on the housing, it is provided in any case that the receptacle groove is formed in the base body, which is used for the formfitting accommodation of the retaining web of the housing. In other words, formfitting fastening of the safety valve or its base body on the housing is provided. The safety valve can thus be fastened in a simple manner in the housing by plugging onto the housing or by plugging into the housing opening.

To enable simple attachment or introduction of the safety valve, the base body is formed to be elastic and consists of the elastomer for this purpose. Because the membrane—in the embodiment of the safety valve comprising the membrane—is formed in one piece and of the same material with the base body, it also consists of the elastomer, namely the same elastomer as the base body. Preferably, the entire safety valve—independently of the other design—is made in one piece and of the same material, so it consists entirely of the elastomer. This enables a particularly simple and cost-effective production of the safety valve, for example, by injection molding or the like.

The elasticity of the base body enables, on the one hand, simple introduction of the retaining web of the housing into the receptacle to fasten the safety valve in a formfitting manner on the housing. On the other hand, the elasticity of the base body ensures reliable sealing of the housing or the housing opening. For this purpose, the receptacle groove is preferably designed having an undersize in relation to the retaining web, so that the base body is pressed continuously on the housing, in particular on the retaining web, due to its elasticity after it is installed on the housing. In this respect, no additional measures have to be taken to seal the housing seal after the safety valve has been installed in or on the housing opening.

On the one hand, the described safety valve is producible extremely cost-effectively, because it preferably consists of a single part, which is produced by injection molding, for example. On the other hand, a simple installation of the safety valve on the housing is implemented, because simple plugging onto or plugging into the housing is sufficient to fasten it reliably on the housing and seal the housing opening.

One refinement of the invention provides that the elastomer is provided as an EPDM. Ethylene propylene diene rubbers (EPDM) are particularly suitable for seals. They are distinguished by high resistance to external influences and high temperatures. The use of such an ethylene-propylene-diene rubber to form the base body and the membrane ensures an outstanding service life of the safety valve.

One preferred design of the invention provides a base body in which a pressure relief opening is formed, which is closed using a membrane formed in one piece and of the same material with the base body and designed to tear at a defined burst pressure. This has already been pointed out above. Such a design enables a particularly accurate definition of the burst pressure.

In the scope of a further embodiment of the invention, it can be provided that the receptacle groove is open inward, in particular in the direction of the pressure relief opening, in the radial direction or is formed open outward in the radial direction, in particular on the side of the safety valve facing away from the pressure relief opening. In the first case, the receptacle groove is thus open inward with respect to a longitudinal center axis of the safety valve or the pressure relief opening, in the latter case outward.

The inwardly open embodiment of the receptacle groove enables, for example, the safety valve to be plugged onto a receptacle nozzle of the housing, which has a retaining web oriented outward in the radial direction. Such a design is distinguished in particular by particularly simple installation, because the base body is expanded outward in the radial direction when the safety valve is attached to the receptacle nozzle. Only a small amount of installation force is thus necessary to install the safety valve.

If the receptacle groove is open outward in the radial direction, the safety valve is thus preferably provided to be introduced into the housing opening of the housing. In this case, the retaining web is provided in the form of an edge of the housing opening. With such a design of the safety valve, the base body is deformed inward in the radial direction during the installation of the safety valve. This requires the application of a greater installation force than in the first-mentioned embodiment. Conversely, however, a better sealing of the housing opening is also implemented by the safety valve.

A preferred further embodiment of the invention provides that the retaining web is provided in the form of an edge of a housing opening formed in a wall of the housing or a formfitting projection of a receptacle nozzle of the housing. This has already been pointed out above.

The edge of the housing opening formed closed at the edge in the housing is preferably used as a retaining web for one embodiment of the safety valve, in which the receptacle groove is open in the direction facing away from the pressure relief opening. In addition to the abovementioned advantages, this variant is distinguished by simple design of the housing, because only the housing opening is to be formed in the wall of the housing. Alternatively, the retaining web can be formed on the receptacle nozzle of the housing and can be provided there in the form of the formfitting projection. The formfitting projection preferably completely surrounds the receptacle nozzle in the circumferential direction, is thus formed continuously, to implement a solid and leak-tight seat of the safety valve on the housing.

One refinement of the invention provides that the receptacle groove—viewed in longitudinal section through the safety valve—is delimited, on the one hand, by a first web and, on the other hand, by a second web arranged spaced apart from the first web, wherein the webs start from the base body and a ramp bevel is formed on the first web on its side facing away from the receptacle groove, so that the first web elastically deflects when the safety valve is pressed into the housing opening or when it is pressed onto the receptacle nozzle.

The receptacle groove is delimited viewed in the axial direction with respect to the longitudinal center axis by the two webs, i.e., the first web and the second web. The two webs are arranged spaced apart from one another here, in particular they extend in parallel or at least nearly in parallel to one another. The webs start from the base body and are therefore connected to one another via this, preferably exclusively via this.

The distance between the webs is preferably dimensioned such that after the retaining web is introduced into the receptacle groove, the first web abuts the retaining web on one side and the second web abuts the retaining web on the other side. Preferably, the distance between the webs in the relaxed state of the safety valve is less than the extension of the retaining web in the axial direction, so that after the installation of the safety valve on the housing, the retaining web is held clamped between the webs.

To simplify introduction of the retaining web into the receptacle groove, the ramp bevel is formed on one of the webs, namely the first web. This faces away from the receptacle groove viewed in the axial direction, so that the first web is elastically deflected by the retaining web when the safety valve is installed. Extremely simple installation of the safety valve on the housing is thus ensured.

A further design of the invention provides that a seal web adjoins the second web, or the seal web is arranged on the side of the base body facing away from the second web, wherein the seal web at least partially overlaps the receptacle groove and/or the first web viewed in longitudinal section. The seal web is used to seal off the housing opening after the installation of the safety valve. The seal web is in particular designed in such a way that, after the safety valve is installed on the housing, it clings to a wall of the housing, wherein the wall comprises the housing opening or the receptacle nozzle.

The seal web can, for example, directly adjoin the second web or extend outward in the radial direction starting therefrom. Alternatively, it is of course possible for the seal web to start from the base body. Here too, however, it preferably extends outward in the radial direction. In the first case in particular, it is provided that the seal web at least partially overlaps the receptacle groove and/or the first web in the axial direction.

The seal web preferably overlaps the receptacle groove completely and the first web at least partially. During the installation of the safety valve on the housing, the seal web is accordingly elastically deflected by the housing, so that is subsequently abuts the housing or the wall of the housing to form a reliable seal. If the seal web is arranged on the side of the base body facing away from the second web, the seal web thus preferably overlaps the first web completely viewed in the axial direction. The seal web is preferably continuous in the circumferential direction in order to achieve a particularly good sealing effect.

A further embodiment of the invention provides that multiple elastically deformable closing elements are arranged in the pressure relief opening, which close the pressure relief opening in a closed position and release the flow in a second position, wherein the closing elements are connected to one another by means of the membrane in the first position and are held in the first position. The pressure relief opening is thus not closed by the membrane alone. Rather, the closing elements are additionally provided, which are elastically deformable at least in some regions. The closing elements are preferably designed to be elastically deformable on the base body or start from the latter.

In the first position, the closing elements abut one another in such a way that they completely close the pressure relief opening. The closing elements are held together by the membrane and held in the first position. The membrane thus ensures, on the one hand, that the closing elements remain in the first position as long as the internal pressure is less than the burst pressure. On the other hand, the membrane eliminates remaining flow paths between the closing elements if they do not completely abut one another to form a seal.

The membrane is thus used not only to close the pressure relief opening fluid-tight, but rather also to hold the closing elements in the first position, wherein the closing elements contribute or at least can contribute to the fluid-tight closing of the pressure relief opening. The closing elements preferably have a significantly greater wall thickness than the membrane, in particular the wall thickness of the closing elements is greater than the wall thickness of the membrane by a factor of at least 2, at least 3, at least 4, at least 5, at least 10, at least 25, at least 50, or at least 100.

The closing elements are designed and arranged on the base body in such a way that, after the membrane has burst, they can be pressed in the direction of the second position by the fluid escaping from the housing. However, they are elastically deformed such that their elasticity presses them in the direction of the first position. After the fluid has escaped from the housing and the pressure compensation has accordingly been produced, the closing elements are thus preferably provided in the first position again, in which they close the pressure relief opening. Due to the bursting of the membrane, however, they now already release the pressure relief opening at an opening pressure which is significantly less than the burst pressure. The described design of the safety valve has the advantage that a certain leak-tightness of the housing is ensured even after the membrane bursts.

A further embodiment of the invention provides that each of the closing elements has, on a side facing away from the base body, two elastically interconnected webs which merge into one another in the direction of the base body. The webs are angled to one another on their side facing toward the base body, for example, they are perpendicular to one another. The closing elements are thus formed essentially V-shaped. The wall thickness of the webs increases in the direction of the base body, preferably continuously, so that the webs merge into one another in the direction of the base body and run together into the base body. This design ensures a reliable release of the pressure relief opening when the membrane bursts. At the same time, sufficient elasticity of the closing elements is achieved in order to shift or press them back into the first position after the pressure equalization.

A further preferred design of the invention provides that in the first position, each of the webs abuts one of the webs of another of the closing elements and is connected to it via the membrane. In the first position, the webs of the two closing elements are provided essentially in parallel to one another and are connected to one another via the membrane. Such a design can be produced particularly easily by injection molding. For example, the safety valve is produced like a hose nozzle, however, in contrast thereto the membrane is not removed after the production. This enables a particularly simple and cost-effective production of the safety valve.

Finally, it can be provided in the scope of one preferred design of the invention that the safety valve is in the form of an injection-molded part. This enables—as already explained—a particularly simple and cost-effective production of the safety valve.

The invention furthermore relates to an energy accumulator for storing electric energy, having at least one battery cell arranged in a closed housing and a safety valve arranged in a housing opening of the housing to release a housing opening of the housing if a defined burst pressure in the housing is reached or exceeded, in particular a safety valve according to the statements in the scope of this description. It is provided here that in a base body of the safety valve consisting of elastomer, a receptacle groove that is continuous in the circumferential direction is formed for the form-fitting accommodation of a retaining web of the housing.

The advantages of such a design of the safety valve or the energy accumulator have already been indicated. Both the energy accumulator and also the safety valve can be refined according to the statements in the scope of this description, so that reference is thus made thereto.

BRIEF DESCRIPTION OF THE DRAWINGS

The invention is explained in greater detail hereinafter on the basis of the exemplary embodiments illustrated in the drawings, without restricting the invention. In the figures.

DETAILED DESCRIPTION

Figure 1:
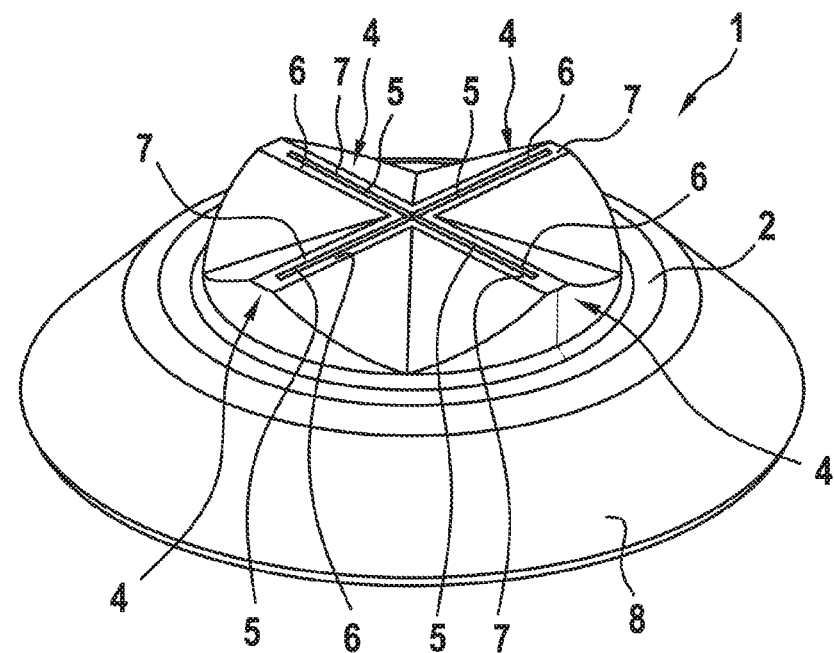
FIG. 1 shows a schematic illustration of a safety valve for a housing in a first embodiment.

FIG. 1 shows a schematic illustration of a safety valve 1 for a housing in a first embodiment. The safety valve 1 has a base body 2, in which a pressure relief opening 3 (not visible here) is formed. In the exemplary embodiment shown here, multiple closing elements 4, for example, four closing elements 4, start from the base body 2. The closing elements 4 are formed in one piece and of the same material with the main body 2. The closing elements 4 are shown in a first position, in which they close the pressure relief opening 3. In the first position, they are connected to a membrane 5, which is formed in one piece and of the same material with them and with the base body 2.

The membrane 5 holds the closing elements 4 in the first position, thus initially preventing the pressure relief opening 3 from being released by the closing elements 4. The membrane 5 is designed such that it tears at a defined burst pressure, so that the closing elements 4 are subsequently permitted to move out of the first position in the direction of the second position, in which the pressure relief opening 3 is released.

It can be seen that the closing elements 4 each consist here of two elastically interconnected webs 6 and 7, which are angled to one another, so that each of the closing elements 4 essentially has a V shape. The webs 6 and 7 of each of the closing elements 4 are elastically interconnected and merge into one another in the direction of the base body 2. The membrane 5 is formed on the safety valve such that each of the webs 6 connects to the respective adjacent web 7 of the corresponding closing element 4 in the first position of the closing elements 4.

To achieve sufficient sealing of the housing by means of the safety valve 1, the safety valve 1 has a seal web 8 that is formed continuously in the circumferential direction with respect to a longitudinal center axis 9 (not shown here) of the safety valve 1. The seal web 8 thus forms a seal ring.

Figure 2:
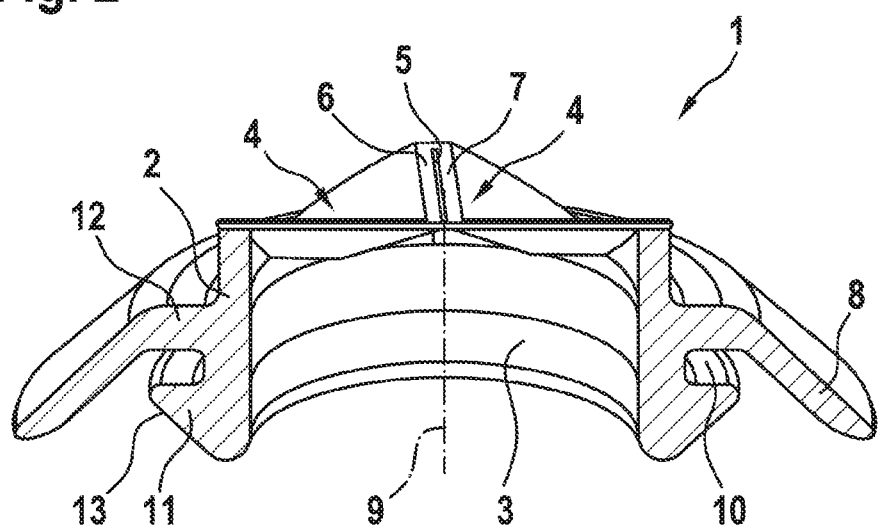
FIG. 2 shows a schematic sectional illustration of the safety valve in the first embodiment.

FIG. 2 shows a schematic longitudinal sectional view of the safety valve 1 along the longitudinal center axis 9. It is apparent that a receptacle groove 10 that is continuous in the circumferential direction is formed in the base body 2 for the formfitting accommodation of a retaining web of a housing. The receptacle groove 10 is provided here between a first web 11 and a second web 12. The webs 11 and 12 are formed by the base body 2 and, in the exemplary embodiment shown here, project in the direction facing away from the pressure relief opening 3. They are arranged and designed such that the receptacle groove 10 is open in the direction facing away from the pressure relief opening 3.

It is clearly apparent that the first web 11 comprises a ramp bevel 13, which enables easy installation of the safety valve 1, because the first web 11 is deflected inward in the radial direction by the retaining web of the housing during the installation of the safety valve 1, until the retaining web has reached the receptacle groove 10. It is furthermore apparent that the seal web 8 starts from the second web 10 in the exemplary embodiment illustrated here, namely extends outward in the radial direction. The seal web 8 is arranged and aligned here such that, viewed in the axial direction, it completely overlaps the receptacle groove 10 and at least partially overlaps the first web 11. It is ensured by such a design of the seal web 8 that the seal web 8 abuts the housing or the wall of the housing to form a reliable seal after the installation of the safety valve 1 on the housing.

Figure 3:
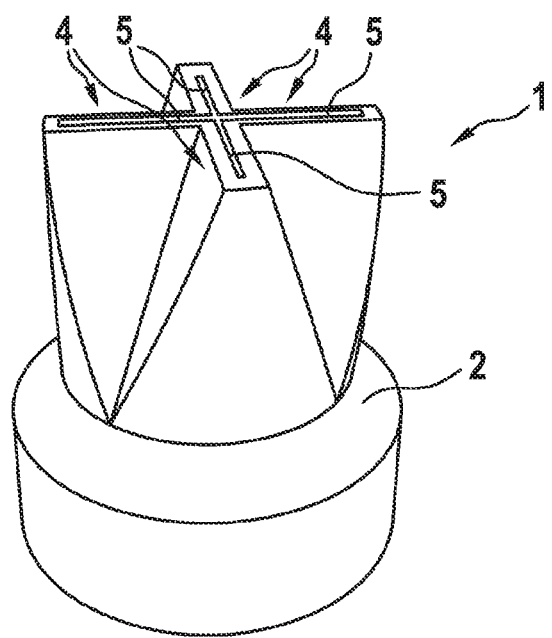
FIG. 3 shows a schematic illustration of the safety valve in a second embodiment.

FIG. 3 shows a schematic illustration of the safety valve 1 in a second embodiment. This is fundamentally similar to that described above, so that reference is made to the above statements and only the differences are discussed hereinafter. These are that the receptacle groove 10 is now no longer open in the direction facing away from the pressure relief opening 3, but rather in the direction of the pressure relief opening 3. Accordingly, the safety valve 1 shown here in the second embodiment is designed to be attached to a receptacle nozzle, wherein the retaining web is formed on the receptacle nozzle. In addition, there is no seal web 8, although this can optionally be formed, of course. The functioning of the safety valve 1 in the second embodiment is identical or at least essentially identical to the safety valve 1 according to the first embodiment.

Figure 4:
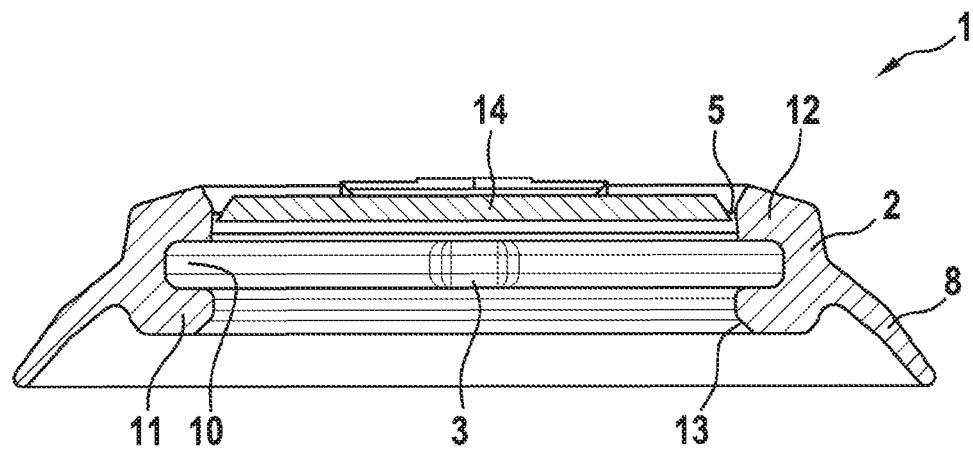
FIG. 4 shows a schematic illustration of the safety valve in a third embodiment.

FIG. 4 shows a schematic sectional illustration of a third embodiment of the safety valve 1. In principle, reference is again made to the above statements and only the differences are discussed hereinafter. These are that instead of the closing elements 5, only one single closing element 14 is provided, which is connected via the membrane 5 to the base body 2, in particular the second web 12. As in the above-described second embodiment, the receptacle groove 10 is open inward in the radial direction, i.e., in the direction of the pressure relief opening 3.

The seal web 8, which is again provided, extends outward in the radial direction, namely starting from the base body 2. It overlaps the first web 11 completely in the axial direction to ensure that the seal web 8 reliably abuts the housing or the wall of the housing. Of course, the safety valve 1 of the fourth embodiment can alternatively also be designed similarly to the first embodiment with respect to the alignment of the receptacle groove 10, so that the receptacle groove 10 opens outward in the radial direction. The webs 11 and 12 are also designed in this case in accordance with the corresponding statements for the first embodiment.

Figure 5:
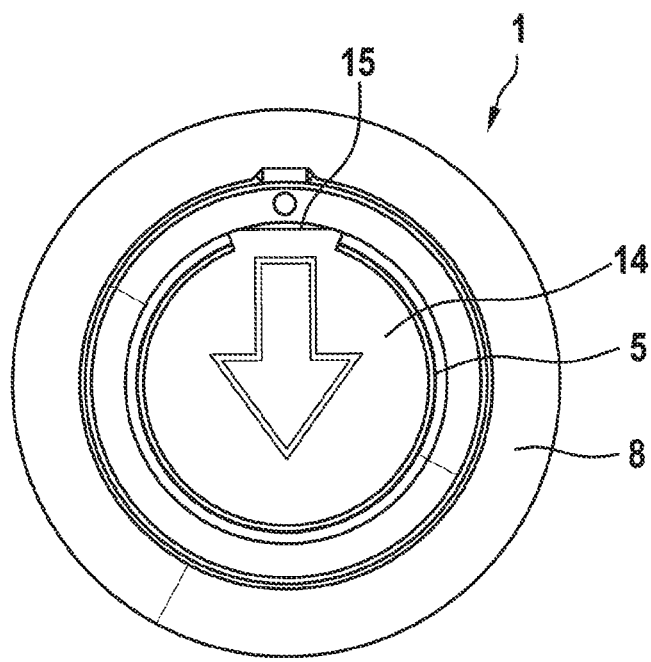
FIG. 5 shows a schematic illustration of the third embodiment of the safety valve in another illustration.

FIG. 5 shows a further schematic illustration of the third embodiment of the safety valve 1. It is apparent that the membrane 5 does not overlap the closing element 14 completely in the circumferential direction, but rather only partially. In this way, the closing element is connected to the base body 2 independently of the membrane 5 in a linkage region 15, in particular is connected in an elastically pivotable manner via a pivotable bearing. If the membrane 5 tears because the burst pressure is reached, the closing element 14 does not detach completely from the main body 2, but rather is held thereon.

On the one hand, loss of the closing element 14 and, on the other hand, damage to other elements or injuries due to a detaching closing element 14 is reliably prevented. For example, the membrane 5 encloses the closing element in the circumferential direction by at least 315°, at least 330°, or at least 345° and the linkage region accordingly at most 45°, at most 30°, or at most 15°.

Figure 6:
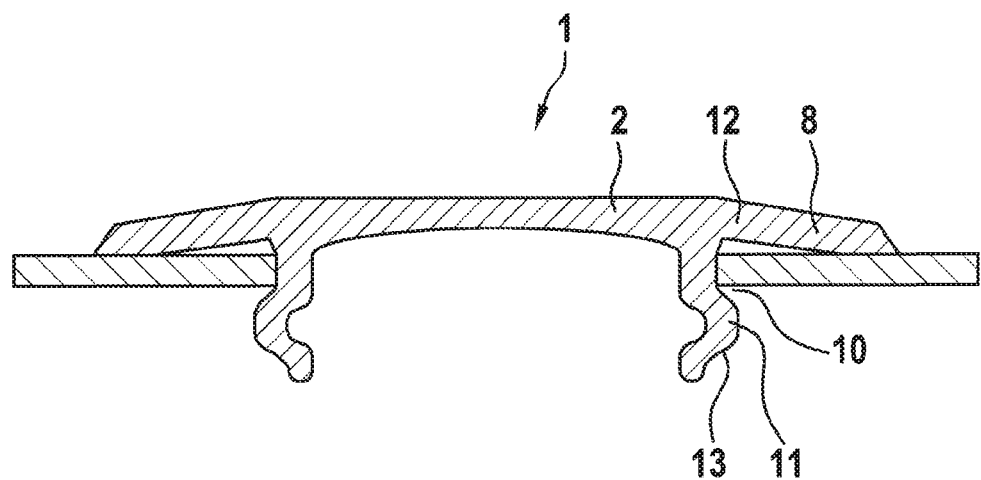
FIG. 6 shows a schematic illustration of a fourth embodiment of the safety valve.

FIG. 6 shows a fourth embodiment of the safety valve 1. It corresponds to the first embodiment with respect to the alignment of the receptacle groove 10, so that reference is made in principle to the corresponding statements. Alternatively, of course, an alignment of the receptacle groove 10 inward in the radial direction is also implementable according to the second and the third embodiment. Reference is also made in this regard to the corresponding statements.

In contrast to the other embodiments, however, the fourth embodiment does not comprise a pressure relief opening 3, closing elements 4 or closing element 14, nor a membrane 5. Rather, the safety valve 1 is inserted like a plug into the housing opening, where it is held by the interaction of the receptacle groove 10 or the webs 11 and 12, on the one hand, and the retaining web, on the other hand. The sealing web 8 abuts the housing to form a seal here, so that outstanding leak-tightness is effectuated.

When the burst pressure is reached or exceeded, the base body 2 elastically deforms such that the formfitting connection is released. Accordingly, the burst pressure can displace the safety valve 1 as a whole out of the housing opening. The safety valve 1 can basically have any shape when viewed in cross section. However, it is preferably round or oval.

The described designs of the safety valve 1 are distinguished, on the one hand, by their cost-effective production and, on the other hand, by their simple and sealed installation on the housing. At least the base body 2, the closing elements 4 and 14, and the membrane 5 consist of an elastomer, preferably of EPDM. The entire safety valve 1 particularly preferably consists of the elastomer. The safety valve 1 can be in the form of an injection molded part, that is to say it can be formed by injection molding. This ensures particularly simple and cost-effective production of the safety valve 1.

The invention claimed is:

1. A safety valve for releasing a housing opening of a housing when a predefined burst pressure in the housing is reached or exceeded, the safety valve comprising:
    a base body formed from an elastomer,
    a receptacle groove formed for a formfitting accommodation of a retaining web of the housing, the receptacle groove extending continuously in a circumferential direction, and
    a pressure relief opening comprising multiple elastically deformable closing elements, which close the pressure relief opening in a first position and release flow in a second position,
    wherein the closing elements are initially connected to one another and held in the first position by a membrane.

2. The safety valve as claimed in claim 1, wherein the receptacle groove is formed to open inwardly in a radial direction or outwardly in the radial direction.

3. The safety valve as claimed in claim 1, wherein the retaining web is an edge of a wall of the housing or a formfitting projection of a receptacle nozzle of the housing.

4. The safety valve as claimed in claim 3, wherein, when viewed longitudinally, the receptacle groove is delimited by a first web and a second web, the second web spaced apart longitudinally from the first web,
    wherein both the first and second webs extend from the base body, and
    wherein a ramp bevel is formed on the first web which deflects when the safety valve is pushed into the housing opening or onto the receptacle nozzle.

5. The safety valve as claimed in claim 4, wherein a seal web is provided adjacent to and radially outward of the second web, and
    wherein the seal web at least partially overlaps the receptacle groove when viewed longitudinally.

6. The safety valve as claimed in claim 1, wherein each of the multiple closing elements has, on a side facing away from the base body, two elastically interconnected webs which merge into one another towards the base body.

7. The safety valve as claimed in claim 6, wherein, in the first position, the elastically interconnected webs of adjacent closing elements abut one another and are connected to one another via the membrane.

8. An energy accumulator for storing electric energy comprising at least one battery cell arranged in a closed housing and at least one of the safety valve according to claim 1.

* * * * *